United States Patent [19]
Patton et al.

[11] Patent Number: 5,989,296
[45] Date of Patent: Nov. 23, 1999

[54] SOLVENT PROCESS FOR RECOVERING INDIGO DYE FROM TEXTILE SCRAP

[75] Inventors: Robert T. Patton, Lake Jackson; David Hall, Auburn, both of Tex.

[73] Assignee: American Renewable Resources LLC, Burlingame, Calif.

[21] Appl. No.: 09/017,063

[22] Filed: Feb. 2, 1998

[51] Int. Cl.$^6$ .............................. C09B 67/34; D09P 1/22; D09P 3/58

[52] U.S. Cl. .......................... 8/440; 8/102; 8/586; 8/614; 8/650; 8/653; 8/918

[58] Field of Search ................................ 8/440, 102, 586, 8/614, 650, 653, 918

[56] References Cited

U.S. PATENT DOCUMENTS

| | | |
|---|---|---|
| 126,663 | 5/1872 | Woodruff . |
| 1,497,138 | 6/1924 | Farrow et al. . |
| 1,743,155 | 1/1930 | Middleton . |
| 1,839,819 | 1/1932 | Whitehead . |
| 3,127,231 | 3/1964 | Neale . |
| 3,844,806 | 10/1974 | Wegmann et al. ...................... 106/193 |
| 4,003,881 | 1/1977 | Sidebotham et al. ................... 528/487 |
| 4,045,171 | 8/1977 | Lancy ............................................. 8/74 |
| 4,092,105 | 5/1978 | Sullins ........................................... 8/81 |
| 5,360,551 | 11/1994 | Weber ....................................... 210/719 |
| 5,481,864 | 1/1996 | Wright ....................................... 57/400 |
| 5,519,925 | 5/1996 | Ball et al. ................................... 28/299 |

*Primary Examiner*—Margaret Einsmann
*Assistant Examiner*—Brian Mruk
*Attorney, Agent, or Firm*—William B. Walker

[57] ABSTRACT

A process for recovering a vat dye from a textile using a heated organic solvent. The textile is contacted with a heated organic solvent in which the dye is soluble until dye is extracted from the textile into the solvent to produce a dye-containing solvent solution. The dye is then recovered from the organic solvent by evaporation of the solvent leaving a dye residue, cooling and precipitation of the dye, or extraction of the dye by contacting the dye-containing solvent solution with an aqueous solution containing a reducing agent for the dye. When dye is extracted from the dye-containing solvent solution by contacting it with an aqueous solution containing a reducing agent, the dye is subsequently insolubilized by oxidation, and the dye is recovered from the aqueous dye solution. This process is particularly advantageous for recovering indigo dye from denim scrap.

21 Claims, 4 Drawing Sheets

SOLVENT PROCESS FOR RECOVERING INDIGO DYE FROM TEXTILE SCRAP

FIELD OF THE INVENTION

This invention relates to a process for recovering indigo and other vat dyes from textile scrap. In particular, the process of this invention is directed to a method for removing indigo dyes from scrap textiles such as denim scrap where the vat dyes have been applied while in a reduced, soluble form and oxidized to precipitate the dye in and on the fabric in an insoluble form.

BACKGROUND OF THE INVENTION

Cotton and other cellulose scraps produced when cutting cotton fabrics in clothing manufacture are a waste product often buried in landfills or consumed in incinerators. Garnetting or other maceration techniques to separate and recover the cotton fibers from the scrap shortens the fiber lengths, and the resulting products have few end uses. As a consequence, over 200 million pounds of denim scrap in the U.S. alone is destroyed as waste each year.

U.S. Pat. Nos. 5,376,143 and 5,471,720 describe a process for recycling denim waste by separating the fibers, preparing a colored yarn of a blend of the recycled fibers and virgin fibers, and preparing denim or similarly dyed fabric from the yarn. This process has not been commercially implemented, perhaps because of costs of fiber separation and the limitations of the shortened fibers in making a strong, durable fabric.

Many applications of cotton, however, do not require long fibers. Cotton batting is a popular absorbent because of its softness and cushioning characteristics and high water absorbency. It is a preferred component for many industrial and household products, such as quilts, upholstery, sanitary napkins and diapers, and medical products such as swabs, bandages and the like. However, most of these applications require that the cotton fibers be purified, colorless, and strong, and a process for recycling cotton scrap to produce cotton fibers for these applications has not been commercially feasible because of the difficulties in processing the scrap. One principal area of difficulty is removal and/or decolorizing of the vat and sulfur dyes present in many cotton scraps such as denim.

Vat dyes consist of solubilized colored compounds which are usefully precipitated as the insoluble form within cellulosic fibers. These compounds are reversibly changed to a water-soluble "leuco" state by chemically reducing them in an alkaline reduction process. This is done easily by mixing the dye into a water solution containing a water-soluble reducing agent, such as sodium hydrosulfite, and alkali, such as sodium hydroxide. In a dying process, the cellulosic fiber is typically immersed in a bath containing such a reduced leuco solution, and the dye is allowed to penetrate the substrate.

After this immersion, the fiber is exposed to an oxidizing environment. Such an environment is air and, in one such process, the yarn, wetted in a leuco solution, is draped in long beams over rolls and exposed to air until the dye and accompanying reducing agents are oxidized. Dilute hydrogen peroxide or another peroxygen compound can also be used for this oxidation. In each case, the oxidized medium converts the leuco dye into its original water-insoluble state. If the dye molecule is contained within the cellulose substrate, the water-insoluble dye is trapped and cannot be removed by casual exposure to water and detergents.

Fabric is often dyed with more than one leuco dye. It is common practice to dye dark shades of indigo first with a black sulfur dye and second with blue indigo dye. The term "dye" as used herein is defined to include a single dye or a mixture of dyes.

U.S. Pat. No. 5,366,510 describes a process for desizing and color-fading indigo-dyed garments by contacting them with a reducing agent in an aqueous solution to extract dye materials before the fabrics are bleached to produce the faded, "stonewashed" or "acid-washed" appearance popular with denim materials. The dye is removed in a conventional rotary drum washer-extractor. Treatment of denim scrap in this procedure would tend to unravel the scraps, producing loose yarn, fiber, and tangles of yarn which foul the bath and equipment components. This treatment also causes the denim scraps to roll up into tubes from which it is difficult to extract dye from the innermost layers.

Dye removal and recovery is highly desirable for the economical recovery of useful products from textile scraps such as denim scraps. The value of the recovered dye partially offsets the costs of recycling. Also, the recovery removes an undesirable component from the waste water.

Solvent removal of dyes from synthetic fabrics is a known procedure. U.S. Pat. No. 1,839,819 describes a method for removing dyes from synthetic textiles using heated organic solvents selected to swell the cellulose acetate and cellulose ether fibers and remove solvent-soluble dyes without any chemical change of the dyes, thus preserving the dyes for reuse.

However, an effective solvent extraction system for textile scraps like denim scraps has not been feasible. The solvent removes fully oxidized dye from the fabric but not the size; however, it does remove natural oils and waxes. Solvent evaporation yields a cake of these components from which wax and oil must be removed by extraction with another solvent that does not dissolve the dye.

Separation of indigo dyes from aqueous solutions by oxidation is known. U.S. Pat. No. 126,663 describes an early mechanized system to reduce hand labor in the manufacture of indigo. In this process, indigo plant is fermented to produce an aqueous solution containing the plant extract. The liquid is separated from the residual plant material and agitated in air to reduce the carbon dioxide content and oxidize the indigo materials. The oxidation product forms a solid precipitate, which is then separated from the solution. However, agitating an organic solvent solution in air does not lead to precipitation of the dye components since they are soluble in their fully oxidized form.

SUMMARY OF THE INVENTION

It is an object of this invention to provide a process for removing indigo and similar vat dyes from textiles such as textile scraps without damaging the fibers or degrading the dye.

It is another object of this invention to recover indigo and similar vat dyes from textile scraps.

In a general process for recovering a vat dye from a textile, the textile is first contacted with a heated organic solvent in which the dye is soluble until dye is extracted from the textile into the solvent to produce a dye-containing solvent solution. The organic solvent preferably has a boiling point within the range of 50° C. to 150° C. and is applied to the textile at such a temperature and pressure as to prevent boiling of the solvent.

The dye-containing solvent solution is subsequently cooled, preferably to a temperature less than 70° C., to precipitate dye from the solvent solution. Optionally, the dye is recovered from the solvent solution.

The dye can be a single dye or a mixture of dyes. Other impurities such as fats, waxes and finishing agents are also removed from the fabric by the solvent.

When a water-immiscible solvent is used, the process of recovering the dye from the solvent solution comprises the following steps: i) contacting the dye-containing solvent solution with an aqueous solution containing a reducing agent for the dye, wherein the reducing agent is present in the aqueous solution in an amount and at a pH sufficient to reduce and solubilize dye from the solvent solution, causing the dye to be converted to its water-soluble leuco state; ii) contacting the dye in aqueous solution with an oxidant, causing the dye to be insolubilized and to precipitate, producing an aqueous dye suspension; and iii) recovering dye from the aqueous dye suspension. The dye may be insolubilized, for example, by aeration with air, then recovered, for example, by removing water from the suspension through a permeable or semi-permeable membrane.

A preferred water-immiscible organic solvent for use in the above dye recovery process is 1,1,2-trichloroethane. The reducing agent is preferably selected from the group consisting of alkali metal hydrosulfites, sulfides, thiosulfates, and oxalates; thiourea dioxide; and alkali metal sulfoxylate formaldehyde.

Alternative methods for recovering dye from the solvent solution which are useful if the organic solvent is water-soluble include 1) removing precipitated dye from the dye-containing solvent solution by first cooling the solution and then filtering the solvent solution to produce a dye filter cake, then vaporizing solvent from the dye filter cake; or 2) vaporizing solvent from the dye-containing solvent solution to concentrate the dye, then recovering dye from the resulting concentrated dye solution or suspension. Dimethyl formamide is a preferred water-soluble organic solvent.

In order to minimize waste, the process of the invention can further comprise the step of recovering the organic solvent from the textile.

The process of the invention is particularly useful for recovering indigo dye from denim scrap material.

DETAILED DESCRIPTION OF THE INVENTION

The process of this invention is described hereinafter in terms of removing indigo dye from denim scrap because it is more demanding and requires description of more details than recovering dye from unfinished and finished cellulose fiber products such as clothing. Dye removal of denim garments is desired to produce products having a faded appearance, for example. It will be readily understood to a person skilled in the art that the process of this invention can be applied to remove a single dye or a mixture of dyes, and remove all or only a portion of the color in a dyed fabric or garment of cellulose or other material, and all of these dye removal and recovery applications are intended to be included within the scope of this invention.

Figure 1:
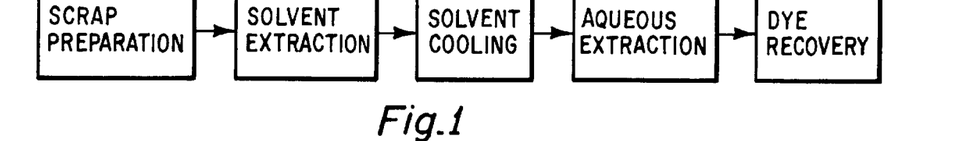
FIG. 1 is a schematic representation of the process of this invention.

As shown in FIG. 1, the process of this invention comprises the steps of scrap preparation, solvent extraction, solvent cooling, solvent recovery from the spent scrap, and dye recovery.

Scrap typically has irregular shapes and sizes. For uniform processing, cutting the fabric pieces to have a maximum length and width of less than 4 inches and preferably about 2 inches in its longest dimension is desirable. The scraps can be cut or chopped into pieces of this size using conventional fabric chopping equipment.

Because of the size and construction of the pieces of denim scrap, it is difficult to accomplish uniform processing in the bath processes for dye removal and bleaching. Denim is a twill fabric and hence does not have a symmetrical weave. On one side of the fabric, more warp yarn is exposed than fill yarn and, on the other side, more fill yarn is exposed than warp yarn. In indigo-dyed denim, the warp yarn is heavily dyed, and the fill yarn is undyed. Because of the asymmetry in construction and the different chemical history of the yarns, when denim scraps are wetted with solvent and agitated in a free state, they curl and roll into spirals of fabric, sometimes tightly. A tightly wound spiral allows poor access to a circulating bath, since the inner portions of the spiral are shielded by the outer layers. As a further problem, vigorously agitated baths tend to unravel the scraps, producing useless balls and tangles of yarn and fabric scraps which foul the bath or equipment components.

This problem is avoided by use of a forced circulation kier or trench method, as described in detail below.

Forced Circulation Kier Method

Figure 2:
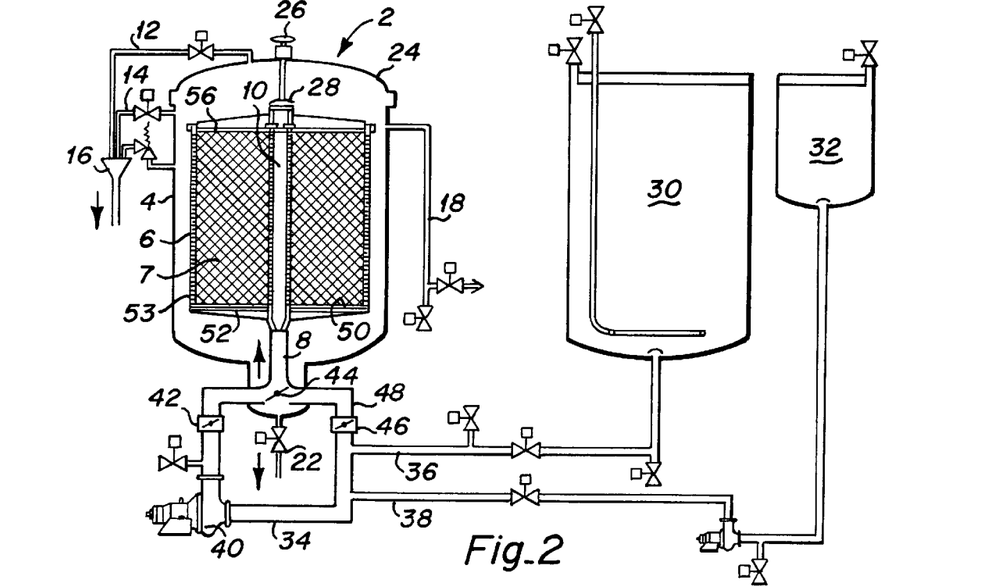
FIG. 2 is a cross-sectional representation of a forced circulation kier suitable for use in the process of this invention.
Figure 3:
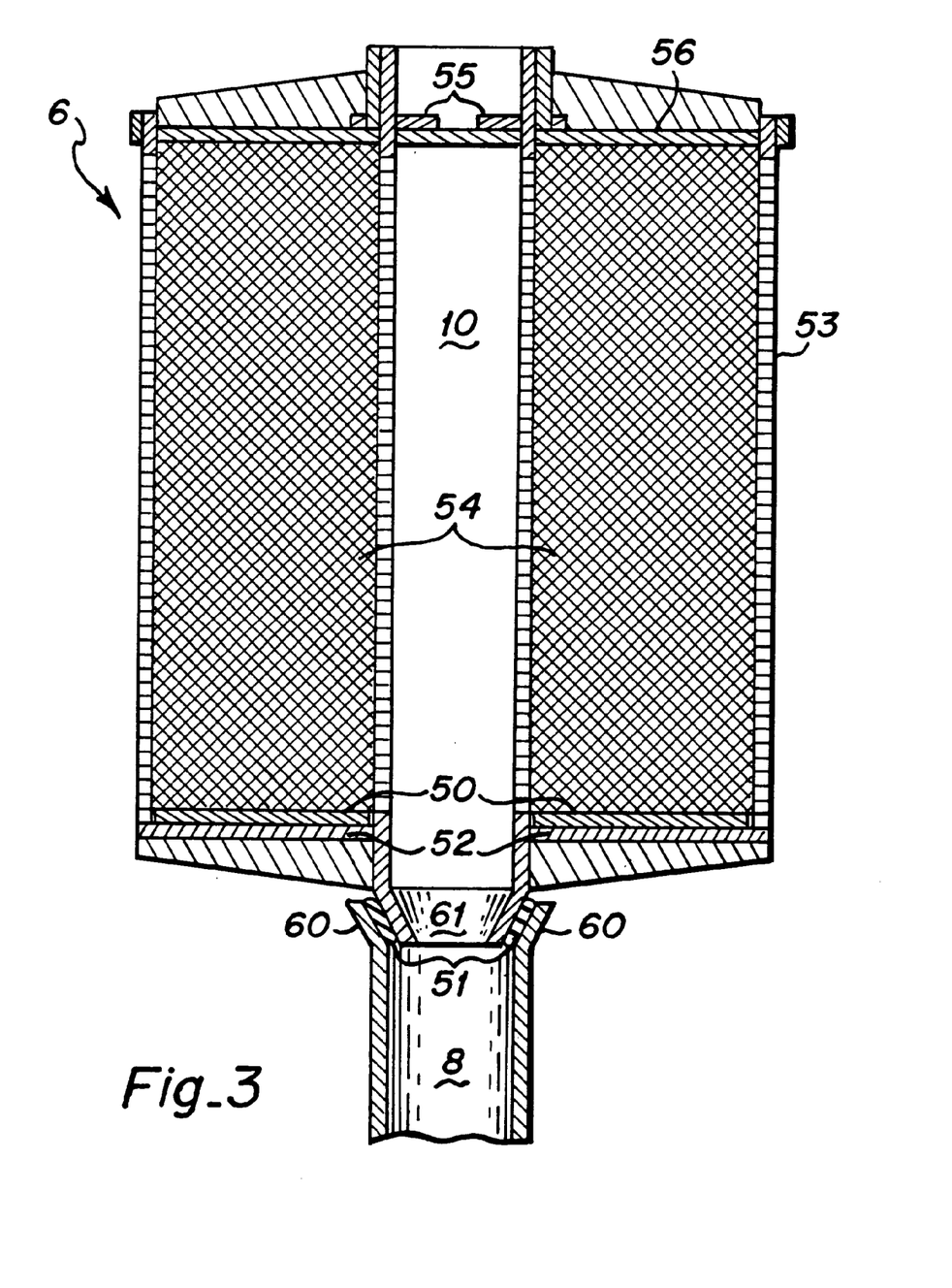
FIG. 3 is a schematic cross-sectional view showing the structure of the treatment section of the vessel shown in FIG. 2.

FIG. 2 is a cross-sectional representation of a forced circulation kier suitable for use in the process of this invention and FIG. 3 is a schematic cross-sectional view showing the structure of the treatment section of the vessel shown in FIG. 2.

The kier 2 comprises a closed vessel 4 housing the liquid treatment basket 6 containing fabric bed 7. Treatment liquid is introduced into the bottom of the treatment basket 6 through pipe 8, passes upward through the perforated distributor 10, passes through the bed 7, and then returns to the pump 40 through pipe 48. The treatment vessel is equipped with valved outlet conduits 12 and 14 leading to the drain 16 and sampling line 18. The vessel is also equipped with conventional heating and cooling coils through which steam or cooling water is passed in order to change the temperature of the contents as desired. Vessel drain line 22 is provided to remove liquid contents during cleaning.

The vessel has a quick closing flanged top lid closure 24 (details not shown), which is sealed into place when the vessel is loaded with denim scrap. After closure, valve wheel 26 is turned to close the end 28 of the distributor and press the basket assembly distribution pipe or sparger 10 down against the gasket 51 (FIG. 3) in the flared supply pipe 8.

Treatment liquids can be prepared in vessels 30 and 32. For processes using reagents which are to be mixed immediately prior to use, the individual reagent solutions are introduced into the supply conduit 34 through conduits 36 and 38 from the respective tanks 30 and 32, where they are mixed as they pass through the pump 40, valves 42 and 44, and into the inlet conduit 8. The disk in valve 44 can be rotated 90° to reverse the direction of liquid flow so that flow penetrates the bed 7 from the outside and returns to the pump 40 through perforated sparger 10 and then pipe 48.

Valve 46 in the return line 48 is usually opened to permit recirculation of liquids through the inlet pump 40.

Details of the treatment basket 6 are shown in FIG. 3. This basket 6 consists of a perforated cylindrical distributor or sparger 10, perforated cylindrical shell 53, a stayed flat bottom 52, and a stayed lid 56. The entire basket assembly sits on a flared extension 60 of the supply pipe 8 with an elastomeric gasket 51 sandwiched between the tapered bottom 61 of the basket sparger 10 and the flared top 60 of the supply pipe 8.

Supported on the top of the stayed basket bottom 52 is a separator plate 50. The separator plate 50 supports the compressed bed of chopped fabric scrap 54. The stayed lid 56 is positioned at the top of the basket assembly 6.

For a preliminary compression step during the fabric loading, the stayed lid 56 is temporarily attached to a hydraulic ram (not shown). The lid 56 is pressed toward the bottom plate 50 to densify the scrap pieces and force them into a void free mass, most of the scraps having the horizontal orientation necessary for uniform fluid circulation between layers. After completing the hydraulic compression stroke, the lid 56 is secured to the standpipe 10 by means of latches 55. Alternatively, the lid 56 can be secured to the basket shell 53 with similar latches (not shown). Once the latches 55 are engaged, the lid 56 is disengaged from the hydraulic ram, and the loaded basket is ready for fabric dye extraction and bleaching. Once the bleaching process is complete, the lid 56 is unlatched and removed, and the compressed fabric cake 54 is removed from the basket 6 by lifting the separator plate 50. The separator plate 50 be provided with chains (not shown) attached at several points around the perimeter of the plate to permit the plate and fabric cake to be lifted from the basket. Alternatively, the system can be provided with a plurality of rams (not shown) passing upward through holes in the stayed plate 52 to raise the separator plate 50 and the fabric cake 54 to the top of the treatment vessel.

Figure 4:
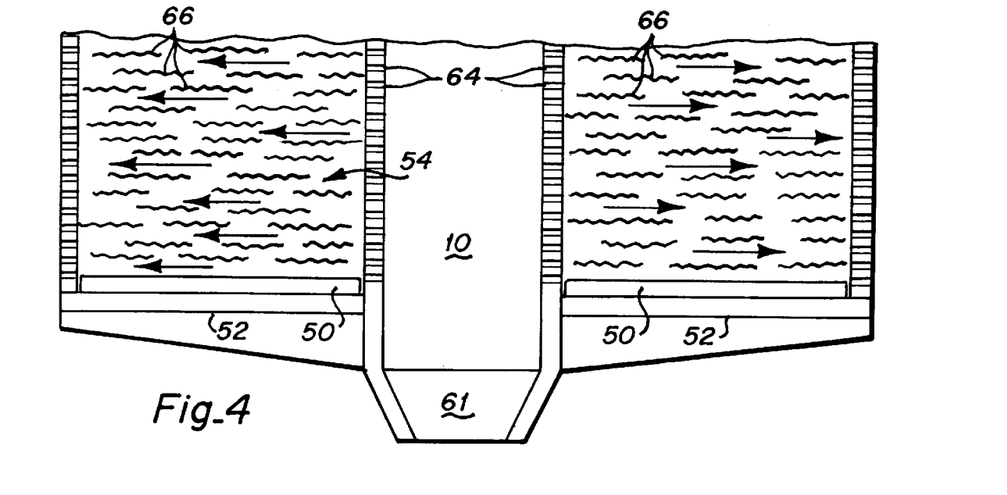
FIG. 4 is a schematic view of layered denim scraps in the treatment section shown in FIG. 3, showing the flow of treatment liquids between the fabric layers to achieve uniform exposure of the fabric surfaces to the treating liquids.

FIG. 4 is a schematic view of layered denim scraps in the treatment section shown in FIG. 3, showing the flow of treatment liquids between the fabric layers to achieve uniform exposure of the fabric surfaces to the treatment liquids. Liquid passing upward through supply conduit 8 passes upward into the perforated distributor 10, which, after closure of the vessel, has a closed outlet. The pressure of the liquid forces it outward through the perforations 64 and through the fabric layers, passing radially outward between opposed surfaces of the fabric pieces 66 and contacting all surfaces uniformly for extraction and/or oxidation of the dye in the fabric.

Referring to FIG. 2, the liquid passes outward through the fabric cake and into space which is present between the treatment section 6 and the wall of vessel 4 and passes downward until it returns to the pump 40 through pipe 48.

In the forced circulation kier process, the dry fabric scraps are deposited in flat layers on bottom plate 50 to form a thick deposit of several feet of fabric around the center liquid distributor 10 to be used for introducing process liquid. The liquid distributor can be a perforated pipe, for example, connected to a pressure pump and process liquid source. The top plate 56 presses against the top surface layer of the fabric, compressing the fabric into a dense cake.

Hot extraction solvent is forced outward through the dense layers of fabric from the center distributor 10. The compressed layers maintain the scraps in a flat, laminated relationship, and the liquid passes under pressure from the center distributor radially outward between adjacent scrap surfaces, contacting all of the fabric surfaces and exposing all of the dyes in the fabric to the extraction solvent in a uniform treatment. The cake configuration prevents curling of the scrap and maintains it in a flat, laminar orientation in the process cake.

Any organic solvent in which the dye or mixture of dyes is most soluble and which is not destructive to the fiber is suitable for use in the extraction. Preferred solvents are those with boiling points of less than 150° C. and which present the least environmental hazards. Solvents with boiling points above 150° C. are difficult to recover from the spent fabric. Solvents with boiling points below 50° C. create excessive pressures at the necessarily high dye extraction temperature. A low solubility of water in the solvent is desirable to prevent dilution through water build-up.

Examples of organic solvents useful in the practice of the invention are as follows:

Halogenated hydrocarbons
    Perchloroethylene
    Trichloroethane
    Trichloroethylene
    Trimethylene bromide
    Trimethylene chlorobromide
    Propylene dibromide
    Trichlorotrifluoro ethane
    Tetrachlorodifluoro ethane Alcohols
    n-Butyl alcohol
    n-Pentyl alcohol
    Isopropyl alcohol
    Isobutyl alcohol
    Isopentyl alcohol Ketones
    Methyl isobutyl ketone
    3-Hexanone
    Methyl ethyl ketone
    Methyl isobutyl ketone
    Acetone Carbonates
    Diethyl carbonate
    Dipropyl carbonate Ethers
    Ethoxybutane
    Isoamyl vinyl ether
    Butyl propyl ether
    Isoamyl propyl ether Butyl ether
sec Butyl ether
Sulfones
  Dimethyl sulfoxide
  Diethyl sulfoxide
  Dibutyl sulfoxide
Amides
  Formamide
  Dimethyl formamide
  Chloral formamide
Esters
  Isoamyl formate
  Amyl formate In order to extract the dye from the fabric scraps, the scraps are contacted with the solvent at an elevated temperature and at such a pressure as to prevent boiling. Preferably, the extraction solvent is applied to the fabric at a temperature within the range of from 80° C. up to 150° C. The dye dissolves in the solvent, is carried away from the fabric and passes to the drain, from which the solvent is collected for dye recovery and reuse.

Trench Method

Figure 5:
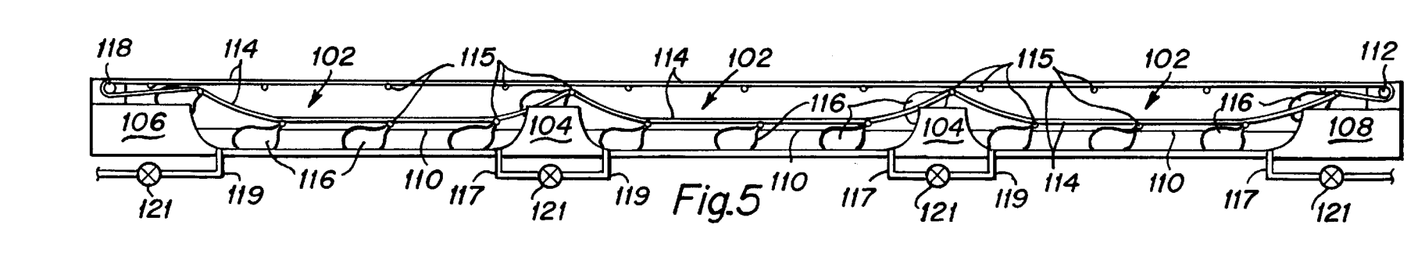
FIG. 5 is a schematic longitudinal cross-sectional view of an abbreviated trench processing system suitable for use in the process of this invention.
Figure 6:
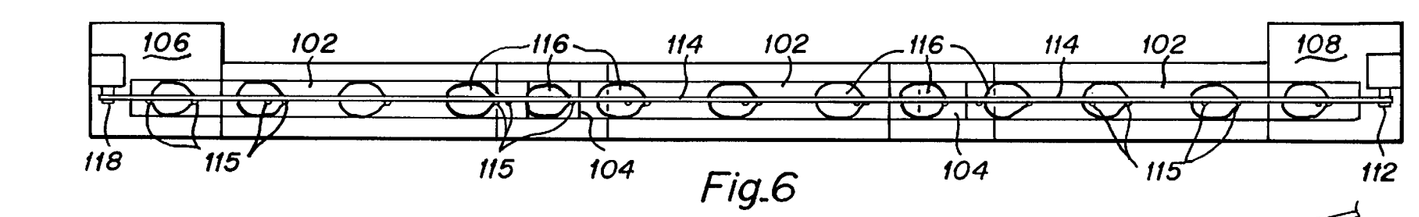
FIG. 6 is a top view of the trench processing system of FIG. 5.

FIG. 5 is a schematic longitudinal cross-sectional view of an abbreviated trench processing system suitable for use in the process of this invention, and FIG. 6 is a top view thereof. The trench system is a series of longitudinal elongated vats 102 optionally separated by raised drain platforms 104 with an untreated bag support platform 106 at the staging end and a processed bag support platform 108 at the receiving end. A drum pulley 112 driven by a motor mounted on platform 108 reels in the endless loop of draw rope or cable 114. The draw rope 114 has rings 115 attached to it for shackling to bags filled with scrap 116, as shown in greater detail in FIG. 10. A matching drum pulley 118 supported on platform 106 reels and returns the draw rope 114 to the staging platform 106 for attachment of bags of scrap awaiting processing. The bags 116 are drawn through treatment liquid 110 in each vat.

Each vat has a liquid inlet pipe 117 and an outlet pipe 119, the outlet pipe from one vat being connected with a valve 121 to the inlet pipe of the adjacent vat for movement of liquid through the series of vats in a direction counter to the direction of movement of the bags 116. The vats can have bottoms at the same elevation or they can have progressively lower elevations in the direction of the liquid flow in order to use gravity to move the liquid between vats. Similarly, the bottom of each vat can be level or sloped slightly upward in the direction of bag movement to facilitate liquid flow in the countercurrent direction.

Figure 7:
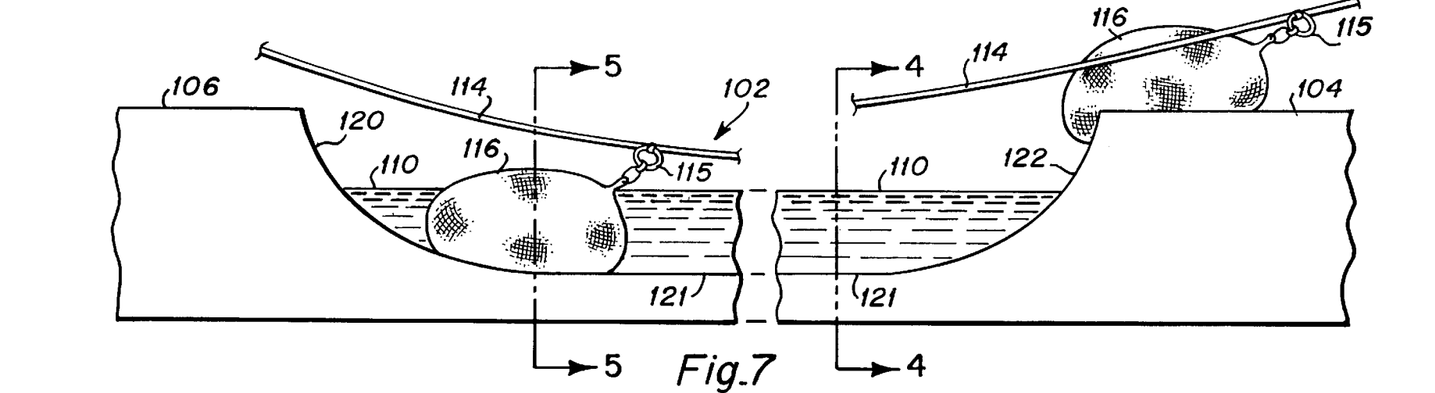
FIG. 7 is a cross-sectional view of a section of the trench processing system of FIG. 5.

FIG. 7 is a cross-sectional view of a section of the trench processing system of FIG. 5. Each treatment vat 102 has a sloped inlet end 120, down which each bag is drawn into the treatment liquid, a flat bottom 121, and a sloped outlet end 122, up which each bag is drawn to a draining platform 104.

Figure 8:
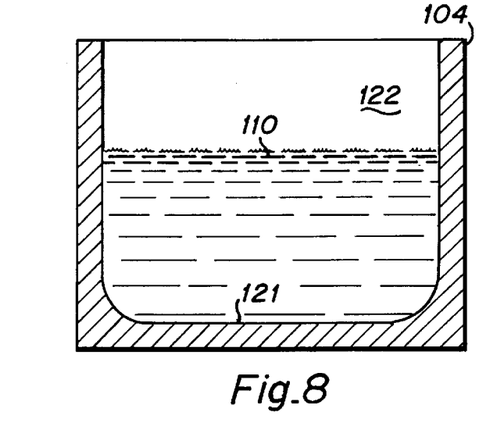
FIG. 8 is a cross-sectional view of the trench taken along the line 4—4 in FIG. 7.
Figure 9:
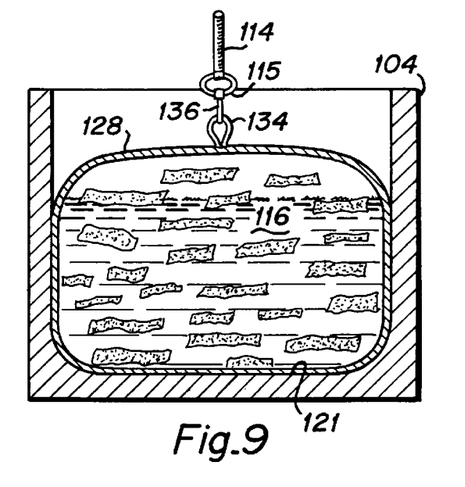
FIG. 9 is a cross-sectional view of the trench and fabric treatment bag taken along the line 5—5 in FIG. 7.

FIG. 8 is a cross-sectional view of the trench taken along the line 4—4 in FIG. 7, and FIG. 9 is a cross-sectional view of the trench and fabric treatment bag taken along the line 5—5 in FIG. 7. The bottom of the vat has a curved shape to which the bags conform. The treatment liquid level 110 is lower than the top 128 of the bag so the bag acts as a plug, forcing the liquid to flow through the contents of each bag as the bag is drawn through the vat.

Figure 10:
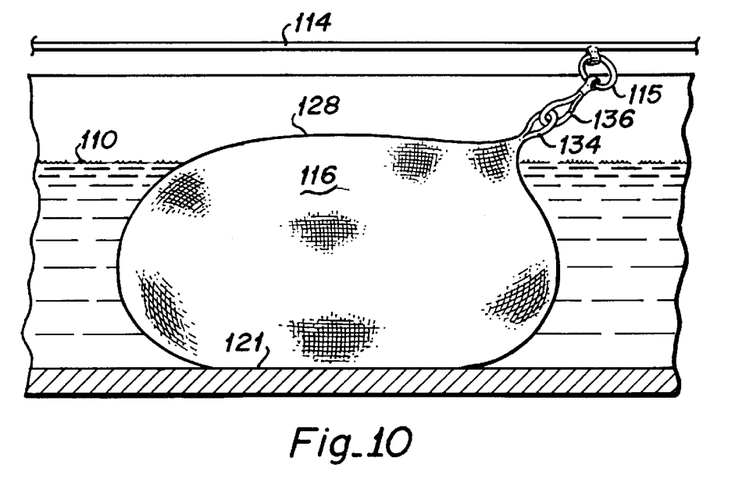
FIG. 10 is a view of a typical scrap bag 116.

FIG. 10 is a view of a typical bag 116. The bags have a conventional open mesh construction, sufficiently tightly woven so as to retain the fabric scraps, but not so tightly woven as to impede liquid flow. Each bag has a loop 134 which is attached by a shackle 136 to a ring 115 fixed to a draw rope 114.

Referring to FIGS. 5 and 6, after the denim scrap is placed in the mesh bag 116, the bag is placed on the untreated fabric platform 106 and shackled to the draw rope 114. The draw rope 114 pulls the filled bag slowly into the first vat 102 where it is thoroughly wetted by the treatment liquid 110. The bag plugs the vat and extends above the top surface of the liquid 110. As the slow bag movement continues, the bag is very slowly drawn through the vat, liquid is pushed down the vat by the bag, raising the liquid level in front of the bag, whereby the difference in liquid level causes the liquid to flow by gravity through the contents of the bag. As the bag movement continues, the bag is drawn up onto platform 104, above the liquid level, and the excess liquid drains from the bag. The bag is then drawn into the next vat of the series where the process is repeated until the bag is drawn from the final vat onto the treated fabric platform 108.

The treatment liquid flows through the series of vats in a direction counter to the direction of movement of the fabric-filled bags, fresh liquid being introduced at the end of the last vat adjacent the treated fabric platform 108 to effect final treatment of the fabric with fresh liquid. The liquid is passed from vat to vat through the conduits 119 and 117 until it is removed from the vat system adjacent the untreated fabric platform 106. In this manner, for dye removal by an organic solvent or an aqueous reducing solution, the liquid removed from the system has the maximum concentration of dye, facilitating dye recovery, and the fabric from which the dye has been completely removed has a final exposure to clean solvent or reducing solution. Similarly, for bleaching, the fabric at the end of the process is exposed to a maximum strength bleaching solution, while the fabric first being introduced to the system with the maximum amount of dye is exposed to a bleaching solution which can be almost exhausted, if desired, to a maximum efficiency for bleaching with the chemical bleaching reagent.

It will be readily apparent to a person skilled in the art that any number of vats can be used, and special pretreatment vats and final rinsing vats can be interposed with separate liquid supplies and waste lines, if the process requires these additional steps. The vats can be provided with conventional heating coils to maintain the vat solutions at a preselected elevated temperature, if desired.

After the denim scrap is placed in a bag 116 and the bag is shackled to a ring 115, the bag is pulled into the adjacent vat into contact with an extraction solvent. As the bag is pulled through a succession of vats and drain platforms and a stream of solvent slowly flows through the bag, the dye in the fabric dissolves in the solvent, is carried away from the fabric and passes to the drain, from which the solvent is collected for dye recovery and reuse.

Preferred solvents and solvent temperatures for use in the process of the invention are discussed in the above section.

Dye Recovery

After the dye or mixture of dyes is extracted from the fabric scraps by either of the above methods, the solvent is cooled to ambient temperature or below to reduce the solubility of the dye in the solvent. Cooling to a temperature of less than 70° C., preferably, less than 40° C., is preferred.

Depending upon the solubility of water in the solvent, one of two dye recovery processes is chosen. In the case where water is not soluble in the solvent, the dye-containing solvent solution is then contacted with an aqueous reducing solution, preferably in a conventional liquid-liquid extraction vessel.

The aqueous reducing solution contains one or more reducing agents for the dye. Suitable reducing agents will reduce the indigo dye to a water-soluble form without degrading or destroying the dye or the extraction solvent. Suitable reducing agents include alkali metal hydrosulfites, sulfides, thiosulfates, and oxalates; thiourea dioxide; and arsenious oxide and stannous sulfate. Of the preferred reducing agents, alkali metal and zinc sulfoxylate formaldehydes are used in acidic and basic conditions, and sodium hydrosulfite, sodium hydrosulfide, and sodium sulfide require basic conditions.

Remarkably, the dye at the organic solvent-water interface is reduced to its water-soluble form and passes into the aqueous phase, leaving behind in the solvent phase, the waxes, oils, and other materials which have been removed from the fabric by the organic solvent. The organic solvent can then be recycled for further extractions and separated from the residues by conventional evaporation and condensation procedures.

The dye can be recovered from the aqueous phase by a variety of conventional procedures. For example, it can be precipitated by aeration, which oxidizes the leuco dye back to the insoluble state.

The precipitated dye may be recovered by passing the aqueous suspension through a membrane unit to remove most of the water and dissolved salts. The remaining dye slurry is then further concentrated by boiling in a stirred, heated kettle, and this slurry concentrate may be dried to a powder on a scraped heated roll.

The spent scrap fabric from which the dye was removed is dried by passing heated air (if the solvent is nonflammable) or inert gas (if the solvent is flammable) through a bed of the saturated fabric. The gas stream leaving the fabric is passed through a heat exchanger which cools the stream and condenses the solvent. The liquid solvent is recovered from the gas stream through the use of a demister or entrainment separation vessel. The dried fabric may then be used as feedstock for shredding or garneting, and the solvent is returned to the dye recovery system.

If the solvent which is used will dissolve in water, then the above process cannot be used to recover the dye. In an alternative dye recovery process, after the cooling step, the dye-containing solvent solution is filtered to recover the dye, and the solvent stream is then distilled to remove water, if necessary, from the overhead of the tower, and waxes, oils, and remaining dye from the tower bottom. The solvent stream is removed as a side stream from the tower and recycled for further extractions.

Dye is removed from the bottoms stream by means of an aqueous extraction using a solution containing a suitable reducing agent. The remaining waxes and oils from the bottoms stream may be either sold or discarded.

The process of this invention is further shown by the following specific but non-limiting examples.

EXAMPLE 1

A forced ciculation kier is loaded with 4000 lbs. of blue denim scrap and 32,000 lbs. of 1,1,2-trichloroethane. The kier is pressurized to 50 psig with nitrogen. Using a shell and tube steam-heated exchanger, the circulated bath is heated to a temperature of 130° C. and the trichloroethane is circulated through the bed at a rate of 7500 gallons per minute.

After circulating the trichloroethane for 30 minutes, a 100 gallon/minute side stream of the solution, now containing extracted indigo dye, is cooled to 30° C. using a water-cooled shell and tube exchanger. The cooled solution is then passed through a countercurrent six-stage liquid/liquid extraction system and contacted at a rate of 100 gallons/minute with 3800 gallons of recirculated water solution containing 0.6 wt. % sodium hydroxide and 0.5 wt. % sodium hydrosulfite powder.

After a total circulation time of 3 hours, the trichloroethane flow through the fabric bed is stopped and the trichloroethane solution is emptied from the kier. A recirculation blower is then started to cause nitrogen at a pressure of 40 psig. to flow through the bed at a rate of 250 cubic feet per second. This gas stream is preheated in a shell and tube steam-heated exchanger to a temperature of 130° C. After passing through the bed, the same stream is passed through another shell and tube exchanger where the temperature is dropped to 75° C. and condensed trichloroethane is removed from the gas. All trichloroethane is returned to the trichloroethane tank for reuse.

After one hour, the blower is stopped, the kier is depressurized, the fabric-holding baskets are removed from the kier, and the fabric is unloaded into a holding bin for fiber recovery.

The sodium hydrosulfite solution, now containing most of the dye extracted by the trichloroethane, is passed through a vessel containing a submerged aerator and having a 30-minute residence time. After aeration, the solution is mixed with dilute hydrochloric acid in the amount necessary to bring the pH to between 6 and 9. This neutralized stream, now containing precipitated indigo dye, is passed through a semipermeable membrane for removal of most of the water. The enriched dye stream leaving the membrane unit passes to a stirred, steam-heated kettle. This kettle boils off water to increase the dye concentration in the slurry to 30% for sale.

In order to prevent a build-up of oils and waxes in the trichloroethane, it is necessary to run a 10-gallon per minute flash evaporator which removes trichloroethane as vapor, which is condensed and returned to a tank for reuse. The remaining hot wax stream is contacted with 0.5 gallon/minute of aqueous, pH 11, 0.5 wt. % sodium hydrosulfite solution in a countercurrent extraction device, and the recovered dye aqueous solution is passed to the dye aeration vessel. The spent wax stream is inventoried for sale.

EXAMPLE 2

A forced ciculation kier is loaded with 4000 lbs. of blue denim scrap and 28,000 lbs. of dimethyl formamide. Using a shell and tube steam-heated exchanger, the circulated bath is heated to a temperature of 130° C. and the dimethyl formamide is circulated through the bed at a rate of 7500 gallons per minute.

After circulating the dimethyl formamide for 30 minutes, a 100 gallon/minute side stream of the solution, now containing extracted indigo dye, is cooled to 30° C. using a water-cooled shell and tube exchanger. The cooled solution is then passed through a filter press to recover crystallized dye. This extraction and filtration continues for the duration of the dimethyl formamide flow through the fabric bed. After filtration, 150° C. nitrogen is passed through the filter cake in the filter press for a period of 30 minutes before dumping the dye into the dye recovery bin.

After a total circulation time of 3 hours, the dimethyl formamide flow through the fabric bed is stopped and the dimethyl formamide solution is emptied from the kier into a holding tank. A recirculation blower is then started to cause nitrogen at a pressure of 15 psig. to flow through the bed at a rate of 250 cubic feet per second. This gas stream is preheated in a shell and tube steam-heated exchanger to a temperature of 135° C. After passing through the bed, the same stream is passed through another shell and tube exchanger where the temperature is dropped to 30° C. and condensed dimethyl formamide is removed from the gas. All dimethyl formamide is returned to the clean dimethyl formamide holding tank for reuse.

After one hour, the blower is stopped, the kier is depressurized, and the fabric is removed from the kier and sent to a holding bin for fiber recovery.

The dimethyl formamide in the holding tank contains indigo dye, dissolved oils, and waxes. This solution is fed at a rate of 25 gallons per minute to tray 3 of a 20-sieve tray distillation column. Water is removed from the tower overhead, clean dimethyl formamide is removed from tray 5, and a stream containing wax, oil, and indigo dye and 50 wt. % dimethyl formamide is removed from the tower bottom. This stream is passed to a steam-heated, stirred kettle where the remaining dimethyl formamide is boiled off and recovered with the kettle pressure reduced to 20 in. Mercury vacuum.

The hot slurry from the kettle is continually recirculated at 5 gallons per minute through a filter press to recover the dye. The solids-free fats and oil are then sent to a holding tank for sale. The indigo dye in the filter press is washed for 5 minutes with fresh 30° C. dimethyl formamide to remove all traces of fats and oil. The dimethyl formamide rinse liquor is recycled to dimethyl formamide storage. Then, 150° C. nitrogen is passed through the filter press for 30 minutes to remove all traces of dimethyl formamide from the indigo dye filter cake. Finally, the dye filter cake is dumped into the dye holding bin.

EXAMPLE 3

Ten grams (10 g) of denim fabric was placed in a soxhlet extraction apparatus. Two hundred fifty milliliters (250 mL) of the appropriate solvent (see Table 1, below) was placed in the lower flask and the number of exchanges required to remove essentially all of the dye was noted. The volume of solvent in the flasks was reduced, followed by cooling to –5° C., and the precipitated, essentially pure dye crystals were recovered.

The crystallized dye could be redissolved in a pH 11 aqueous solution of 0.5% sodium hydrosulfite solution, and the dye was substantive to 100% cotton, i.e., there was no loss of efficacy of the recovered dye.

TABLE 1

| Solvent | Soxhlet Exchanges to Remove Dye |
| --- | --- |
| Methyl ethyl ketone | 50 |
| Perchloroethylene | 90 |
| Trichloroethane | 50 |
| Dimethyl formamide | 10 |
| Isopropyl alcohol | 150 |
| Acetone | 100 |
| Trichlorotrifluoroethane (Freon TF) | 110 |
| Dimethyl sulfoxide | 15 |
| Diethyl carbonate | 50 |
| Dipropyl carbonate | 55 |

EXAMPLE 4

Two-inch square blue denim fabric swatches were put in pressure bombs, and 100 ml individually of each of the solvents listed in Table 1, above, were used to extract the dye from the swatches at the boiling point of the solvent and also at temperatures of 25° C. above their boiling points.

The amount of dye that was soluble in the solvents was shown to be significantly increased when the extractions were done above their normal boiling points.

EXAMPLE 5

Two grams (2 g) of indigo dye was solubilized in 100 ml of pH 11 sodium hydrosulfite solution, after which the dye was precipitated in a finely divided state by gently bubbling air through the solution. Twenty-five milliliters (25 mL) of this dye solution, along with 100 ml of dipropyl carbonate (DPC). was added to a pressure bomb and the solution heated to 125° C. All of the dye was removed from the water layer and remained in the DPC layer after the solution was again cooled to room temperature.

The dye recovered from the DPC was shown to have the same properties of the purified indigo dye in Example 3, above.

Obviously, numerous modifications and variations of the present invention are possible in light of the above teachings. It is therefore to be understood that within the scope of the appended claims, the invention may be practiced otherwise than as specifically described herein.

The invention claimed is:

1. A process for recovering a vat dye from a cotton textile using an organic solvent, comprising the steps of
    a) contacting the textile with a heated organic solvent in which the dye is soluble until dye is extracted from the textile into the solvent to produce a dye-containing solvent solution; and
    b) precipitating dye from the dye-containing solvent solution by cooling said solvent solution.

2. A process of claim 1 wherein the dye is a mixture of dyes.

3. A process of claim 1 including the further step of
    c) recovering dye from the solvent solution.

4. A process of claim 1 wherein the solvent removes fats, waxes or finishing agents from the cotton textile.

5. The process of claim 1, wherein the cotton textile is denim scrap.

6. The process of claim 1, wherein the dye comprises indigo dye.

7. The process of claim 1, wherein the organic solvent has a boiling point within the range of 50° C. to 150° C.

8. The process of claim 1, wherein the organic solvent is applied to the cotton textile at such a temperature and pressure so as to prevent boiling of the solvent.

9. The process of claim 1, wherein the dye-containing solvent solution is cooled to a temperature less than 70° C.

10. The process of claim 3, wherein the organic solvent is water-immiscible and wherein the process of recovering the dye from the solvent solution comprises the steps of
    c1) contacting the dye-containing solvent solution with an aqueous solution containing a reducing agent for the dye, wherein said reducing agent is present in said aqueous solution in an amount and at a pH sufficient to reduce and solubilize dye from said solvent solution, whereby the dye is converted to its water-soluble leuco state;
    c2) contacting the dye in aqueous solution with an oxidant, whereby the dye is insolubilized and caused to precipitate, producing an aqueous dye suspension; and
    c3) removing precipitated dye from said aqueous dye suspension.

11. The process of claim 10, wherein the water-immiscible organic solvent is 1,1,2-trichloroethane.

12. The process of claim 10, wherein the reducing agent is selected from the group consisting of alkali metal hydrosulfites, sulfides, thiosulfates, and oxalates; thiourea dioxide; and alkali metal sulfoxylate formaldehyde.

13. The process of claim 10, wherein the oxidant in step c2 is air.

14. The process of claim 10, wherein the dye is recovered by removing water from the suspension through a permeable or semi-permeable membrane.

15. The process of claim 3, wherein the process of recovering the dye from the solvent solution comprises the steps of c1) removing precipitated dye from the solvent solution by filtering said solvent solution to produce a dye filter cake; and c2) vaporizing solvent from said dye filter cake.

16. The process of claim 15, wherein the organic solvent is water-soluble.

17. The process of claim 16, wherein the water-soluble organic solvent is dimethyl formamide.

18. The process of claim 3, wherein the process of recovering the dye from the solvent solution comprises the steps of c1) vaporizing solvent from said dye-containing solvent solution to concentrate the dye and form a suspension; and c2) recovering dye from the concentrated dye solution and suspension.

19. The process of claim 18, wherein the organic solvent is water-soluble.

20. The process of claim 19, wherein the water-soluble organic solvent is dimethyl formamide.

21. The process of claim 1, further including the step of c) recovering the solvent from the cotton textile.

* * * * *